(12) United States Patent
Balko et al.

(10) Patent No.: US 8,560,372 B2
(45) Date of Patent: Oct. 15, 2013

(54) COMPILING WORKFLOWS INTO INSTRUCTIONS FOR A STATE CORRELATION ENGINE

(75) Inventors: Soeren Balko, Weinheim (DE); Franz Weber, Wiesloch (DE); Matthias Miltz, Heidelberg (DE)

(73) Assignee: SAP AG, Walldorf (DE)

(*) Notice: Subject to any disclaimer, the term of this patent is extended or adjusted under 35 U.S.C. 154(b) by 1667 days.

(21) Appl. No.: 11/963,817

(22) Filed: Dec. 22, 2007

(65) Prior Publication Data

US 2009/0164985 A1    Jun. 25, 2009

(51) Int. Cl.
    *G06Q 10/00*     (2012.01)

(52) U.S. Cl.
    USPC .............................. 705/7.27; 718/108; 700/29

(58) Field of Classification Search
    USPC ...................... 705/7.27; 700/29; 718/100, 108
    See application file for complete search history.

(56) References Cited

U.S. PATENT DOCUMENTS

| | | | |
|---|---|---|---|
| 2007/0135936 A1* | 6/2007 | Dumas et al. .................... | 700/29 |
| 2007/0150075 A1* | 6/2007 | Dumas et al. .................... | 700/29 |
| 2008/0141336 A1* | 6/2008 | Haller ............................... | 726/1 |
| 2009/0055203 A1* | 2/2009 | Dicken et al. ..................... | 705/1 |
| 2009/0083087 A1* | 3/2009 | Wolter et al. ..................... | 705/7 |

OTHER PUBLICATIONS

Zhao, Haiyan and Cao, Jian. ECA Rule based Agent for Business Process Management. Manuscript. University of Shanghai. China.*
Huang and Stohr. Design and Implementation of a Business Process Rules Engine. Stevens Institute of Technology. New Jersey. Jan. 2007.*
Wang, Yi. Li, Minglu. Cao, Jian. Tang, Feilong. Chen, Lin. Cao, Lei. An ECA-Rule-Based Workflow Management Approach for Web SErvices Composition. Dept of computer sciend and engineering. Shanghai Jiao Tong University. 2005.*
Chen, Shyh-Kwei. Jeng, Jun-Jang. Chang, Henry. Complex Event Processing Using Simple Rule-based Event Correlation Engines for Business Performance Management. IBM T.J. Watson Research Center. 2006.*

\* cited by examiner

*Primary Examiner* — Johnna Loftis
(74) *Attorney, Agent, or Firm* — Mintz Levin Cohn Ferris Glovsky and Popeo, P.C.

(57) ABSTRACT

Methods and apparatus, including computer program products, for compiling workflows into instructions for a state correlation engine. In general, data characterizing a workflow of a process is received and a network representation of event-condition-action rules representing the workflow is generated. The workflow of the process may be modeled in accordance with a notation similar to the Business Process Modeling Notation. The network representation of event-condition-action rules may include a combination of source nodes representing events, operator nodes representing conditions, and action nodes representing transactions. Events of the source nodes may be represented types of objects of a type language, where a correlation engine is to execute an event-condition-action rule based on an existence of a combination of types of a rule.

21 Claims, 4 Drawing Sheets

US 8,560,372 B2

COMPILING WORKFLOWS INTO INSTRUCTIONS FOR A STATE CORRELATION ENGINE

BACKGROUND

The present disclosure relates to data processing by means of a digital computer, and more particularly to compiling workflows into instructions for a state correlation engine.

In general, business process modeling languages may be used to implement business workflows in enterprise systems. An example of a standard for modeling languages may be Business Process Modeling Notation, which provides a set of modeling notations to follow when modeling a business process in accordance with a workflow that follows a control flow based paradigm. In the past, a model of a business process may be compiled for processing with a workflow engine.

SUMMARY

The subject matter disclosed herein provides methods and apparatus, including computer program products, that implement techniques related to compiling workflows into instructions for a state correlation engine.

In one general aspect, data characterizing a workflow of a process is received and a network representation of event-condition-action rules representing the workflow is generated.

The subject matter may be implemented as, for example, computer program products (e.g., as source code or compiled code tangibly embodied in computer-readable media), computer-implemented methods, and systems.

Variations may include one or more of the following features. The workflow of the process may be modeled in accordance with a notation similar to the Business Process Modeling Notation (BPMN), which may include flow objects, connecting objects, swimlanes, and artifacts. The workflow may be modeled in accordance with workflow patterns (e.g., generic workflow patterns as presented by W. M. P. van der Aalst et al in "Workflow Patterns," Distributed and Parallel Databases, 14(3), pages 5-51, July 2003). Generating a network representation of event-condition-action rules may include generating a network of event-condition-action rules for each component of the workflow. The generating may further include generating type information according to a type language and generating custom adapter configuration to influence run-time behavior of adapters. The network representation of event-condition-action rules may include a combination of source nodes representing events, operator nodes representing conditions, and action nodes representing transactions. The events of the source nodes may be represented by types of objects of a type language, where a correlation engine is to execute an event-condition-action rule based on a combination of types of a rule being instantiated. Operator nodes of an event-condition-action rule may be selected from types of operator nodes including a filter operator node type and a join operator node type. Operator nodes of a network representation of an event-condition-action rule may be linked to each other to describe a flow of evaluation of operator nodes across a network of conditions. Action nodes may include a script in accordance with a scripting language to describe transactions to be performed upon evaluation of operator nodes connected to corresponding action nodes.

The subject matter described herein can be implemented to realize one or more of the following advantages. A gap between control flow-based paradigms (e.g., including workflows) and the mechanics of an abstract state correlation engine may be bridged with a compiler. A source model of an implementation of a business process may be modeled in accordance with a control flow based modeling paradigm to model workflows which may be used to provide a great expressiveness as may be desired in business applications. The source model may be separated from a target model for execution such that a user modeling workflows may focus on business logic and be removed from details of execution aspects (e.g., concurrency, transactionality, failover, and the like). A combination of multiple paradigms may be included in a source model (e.g., control flow, complex event processing, business rules, state charts, and the like) and be compiled to a joint target model for execution. A compiler may transform a source model to a model for execution by a correlation engine which avoids performance problems associated with traditional workflow engines. In addition, other aspects that may be avoided in contrast to a traditional workflow engine may include constrained expressiveness, poor scalability, and tight coupling of a source model with concrete execution aspects. A state correlation engine may be advantageous as a state correlation engine may be optimized to efficiently support condition evaluations as may be found in various workflow patterns, such as "multiple choice" (e.g., BPMN: OR-split), "deferred choice" (e.g., BPMN: pick-split), message receipt (e.g., BPMN: intermediate message event), and the like. In addition, interoperability between different paradigms of business applications (including workflow engines, complex event processing/business activity monitoring, and state tracking) may be improved due to a joint execution format of a network representation of event-condition-action rules.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
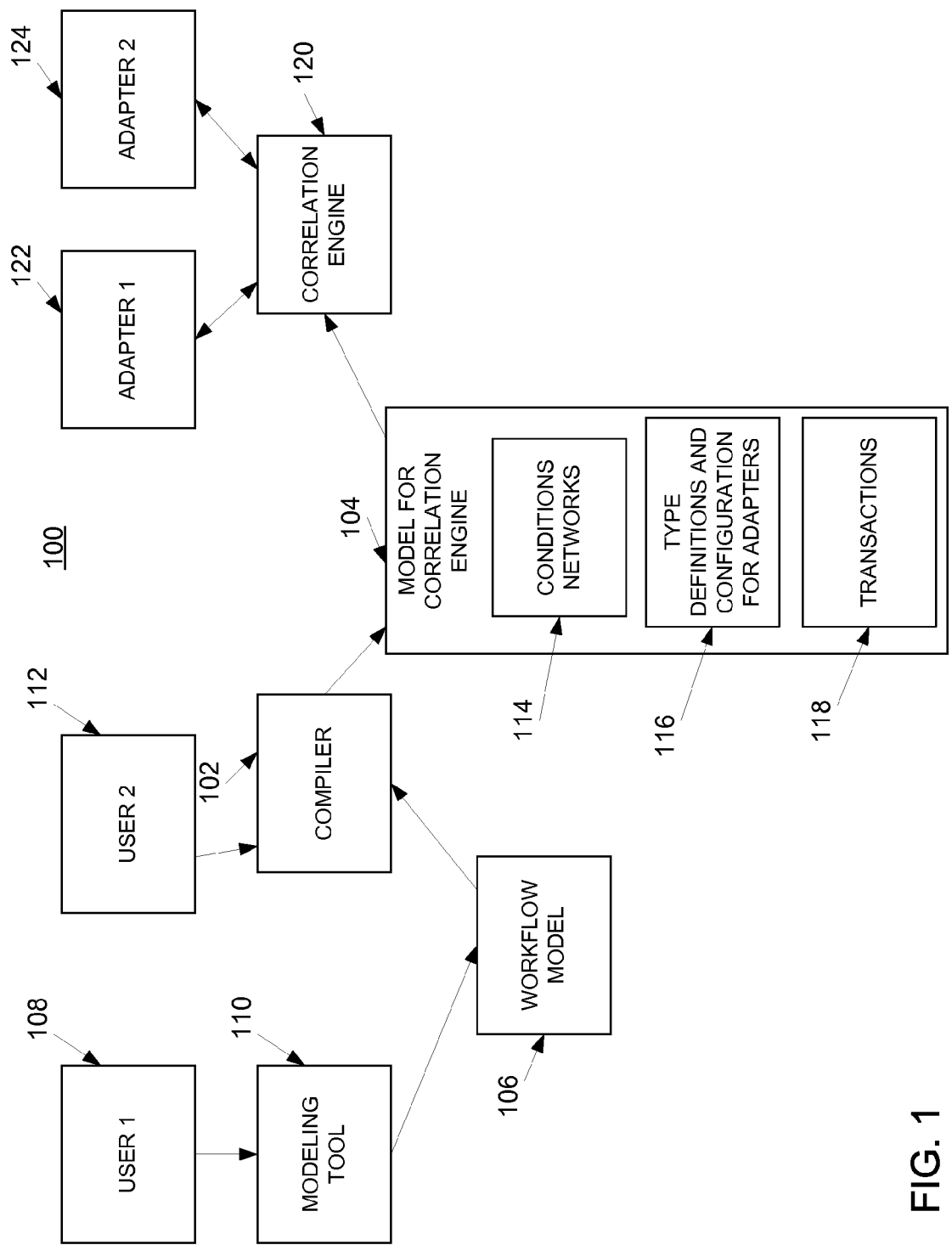
FIG. 1 is a block diagram of a system including a compiler to generate a model for execution by a correlation engine from a workflow model of a business process.

FIG. 1 is a block diagram of a system 100 including a compiler 102 to generate a model 104 for execution by a correlation engine from a workflow model 106 of a business process. In general, a workflow model may be based on a control flow based modeling language, which may use a notation such as Business Process Modeling Notation (BPMN) and may be in accordance with a schema such as BPEL (Business Process Execution Language). The workflow model 106 may be a model of a business process that is implemented in accordance with a modeling language. For example, a business process of selling a house may be implemented using constructs of a control flow based modeling language. Following that example, a workflow may include parallel tasks of selecting a real estate agent and requesting repairs of a house that may be followed with a synchronization workflow pattern that is followed by a task of publishing an offer for the house.

In general, operation of the system 100 may be as follows. A first user 108 may use the modeling tool 110 to generate the workflow model 106. A second user 112 may cause the compiler 102 to generate the model 104 for a correlation engine from the workflow model 106. The model 104 for a correlation engine may include a combination of condition networks 114, type definitions and configurations for adapters 116, and transactions 118 for the types. A correlation engine 120 may take the model 104 for a correlation engine as input and execute the model with use of a first adapter 122 and a second adapter 124. The first and second adapters 122, 124 may connect the correlation engine 120 with external systems, parties, or both (e.g., there may be an adapter to send and receive electronic mail, or an adapter to consume web service calls).

The first and second users 108, 112 may be first and second users in the sense that they may be different users of different systems or may have different roles. For example, the first user 108 may be a business expert that generates workflow models in accordance with BPMN and the second user 112 may be a technical user that deploys the correlation engine 120 and uses the compiler 102 to generate models for the correlation engine from workflow models. For example, a software vendor may generate workflow models and provide them to customers and the customers may have the workflow models compiled to models for execution by a correlation engine. In variations, the first and second users 108, 112 may be a same user, the modeling tool 110 may be integrated with the compiler 102 such that models for correlation engines are always persisted from a modeling tool, and the like.

The modeling tool 110 may be a modeling tool that allows for drafting of models of business processes in accordance with a control flow based paradigm. To allow a user to perform modeling, the modeling tool 110 may offer a graphical user interface in which modeling constructs may be dragged, dropped, and configured to generate workflow models in accordance with a modeling language supported by the modeling tool 110. A modeling language supported by the modeling tool 110 may implement BPMN, a derivative of BPMN, or other notation languages. Constructs of the notation of the modeling language may include flow objects, which may include events, activities, and gateways; connecting objects, which may include sequence flow connectors, message flow connectors, and association connectors; swimlanes, which may include pool and lane elements; and artifacts, which may include data objects, group notation elements, and annotation elements. Of the notation elements, only a subset may be relevant for execution as some elements, such as annotation elements, might not affect execution of a workflow. Thus, only a subset of notation elements may be transformed to a target model for execution. By combining a selection of constructs of the notation language (or a workflow modeling language), a workflow model may provide a computer-implemented representation of a business process.

The workflow model 106 may be any type of workflow model, may be in accordance with any control flow based modeling language, and may use a notation such as BPMN. The workflow model 106 may be generated by business experts and deployed for use at enterprise systems.

As discussed above, the model 104 for a correlation engine may include a combination of condition networks 114, type definitions and configurations for adapters 116, and transactions 118. A combination of condition networks 114, type definitions and configurations for adapters 116, and transactions 118 may represent elements of the workflow model 106 from which the model 104 for a correlation engine is derived. In particular, elements of the workflow model 106 may be mapped to the combination of components that represent the model 104 for a correlation engine. For example, a type of gateway of a workflow model, such as an and-split gateway, may have a corresponding representation as a network of nodes representing an event-condition-action rule to which the gateway may be mapped when generating the model 104 for a correlation engine.

One or more network representations of event-condition-action rules may make up the model 104 for a correlation engine, where the networks may be linked together to form a model of a process that is semantically similar to a workflow model. Each network representation of event-condition-action rules (which may be referred to as trigger networks) may follow a paradigm where there are generally three types of nodes, where the types of nodes include source nodes, operator nodes, and target nodes. Following that paradigm, for an event-condition-action rule the type definitions 116 may be source nodes that represent events (e.g., state changes), the condition networks 114 may be operator nodes that represent conditions, and the transactions 118 may be target nodes that represent actions.

The type definitions 116 may be defined in accordance with an object-oriented data model where different types of objects represent different types of events. The data model may be limited, and have a restricted type system (targeted on correlation) and foreign keys (cross-object associations). One or more combinations of types may define an event of an event-condition-action rule. At run-time, a correlation engine may determine whether a combination of instances of types satisfy a combination of types for a rule such that a condition network of a rule is to be evaluated, where instances of types may be generated, altered, or deleted by a correlation engine as a result of adapters or transactions of event-condition-action rules (e.g., as part of an action script). Type definitions may be adapter-governed such that a type definition may correspond to a type of event received by an adapter such that when an adapter receives an event, an object (also referred to as an instance of a type) corresponding to a type definition is generated.

An adapter configuration may define a customization of an adapter to influence aspects of an adapter's runtime behavior. An adapter configuration may be semi-structured data for custom interpretation by an adapter. As examples, an adapter configuration may include an address to which electronic mail has to be sent; a web service endpoint and operation that is to be used in a web service call; mapping instructions (e.g., an eXtensible Stylesheet Language Transformation script) that are to be performed in a mapping step; and type information (e.g., as eXtensible Markup Language Schema Definition) that is used to hold business data.

The condition networks 114 are condition networks in the sense of being networks, similar to Rete networks, of nodes where each node may represent an operation to be performed as part of evaluating a condition network and the nodes of the network are connected in a network to define a flow of evaluation. The conditions networks 114 may be directed, acyclic graphs of operator nodes where each operator may have different semantics and arity. A type of an operator node may represent an atomic predicate. Types of atomic predicates and their operator nodes may include constant selection, which may be represented by a filter operator node and may be used to determine whether one or more attributes of an instance satisfy certain criteria; inner join, which may be represented by a join operator node and may be used to generate pairs of instances with the assistance of an internal table having columns to represent pairs to match according to a key; projection, which may be represented by a swizzle operator node and may be used to map a sequence of instances to another sequence (e.g., having different ordering or numbers of instances); and negated existence quantifier, which may be represented by an inhibitor operator node and may facilitate predicates that check for the absence of a matching join partner. Of the types of nodes, only a few nodes may hold state (joins/inhibitors); however, a correlation engine in general may hold all instances (of the declared types) that exist at a given moment.

By combining a selection of types of operator nodes, a condition network of a rule may represent a complex First Order Logic (FOL) expression. For example, a condition network for an AND-merge construct may represent a FOL expression of: exists Token T1, T2, exists Instance I with T1.owner=I and T2.owner=I and T1.state=<after Task1> and T2.state=<after Task2>.

The transactions 118 may result in updates of information of instances of types. Updates to instances of types that may be performed may include creating type instances, deleting type instances, or altering information of type instances. In addition, the transactions 118 may include commands for invoking functions on instances of types. In general, the transactions 118 are executed as a result of successful evaluation of a condition network. The transactions 118 may be platform independent such that correlation engines on different platforms may interpret and execute the same transactions due a separation between a language to describe transactions (e.g., a scripting language) and an underlying platform of a correlation engine. Functions that are part of transactions may be extension points (e.g., for adapters) to implement custom operation for a certain type instance. Examples of custom operations that may be implemented as part of a function might include sending electronic mail, invoking web services, delegating tasks, performing mappings (data transformations), and the like.

Compilation of the workflow model 106 to the model 104 for a correlation engine may follow three stages of compilation. The three stages may include an initial analysis stage to perform a labeling of control flow connectors to identify states to correlate on for the workflow execution. In a second stage, which may be referred to as a transformation stage, compilation may include independently translating each source artifact (e.g., artifact in the sense of being an element of a workflow modeling language and not limited to artifacts in the BPMN sense of artifact) into zero or more target artifacts being (at least) event-condition-action-like rules, where a rule is represented as one or more Rete network subgraphs (representing a condition part), one or more transactions (representing an action part; e.g., a script), and one or more types (representing an event part). For example, source model artifacts, such as activities, gateways, events, services, and the like, may be transformed to target model artifacts, such as types, execution plans for event-condition-action rules (which may be Rete-based networks of nodes representing conditions), and transactions; and may further include runtime adapter configurations, where at runtime, the target artifacts mimic semantics of the source artifacts. A third, final optimization stage may apply logical and physical optimization strategies (as known from database query plan optimization) atop a generated target model to enhance runtime behavior of the target model with regard to performance and memory consumption. Optimizations techniques may include detection and removal of redundant Rete network subgraphs, operator pipelining, selectivity ordering, and the like.

The first stage may include tagging edges of control flows of a workflow model, where the tagging may include tagging any control flow edge with a unique identifier, where there may be some exceptions to uniqueness (e.g., for XOR merges uniqueness may be broken). The identifier may be used as a "state" of passing tokens.

In the second stage, each source model element (activities, gateways, events, etc.) may be visited individually and a compiler rule for a corresponding element type may be applied. For example, data objects (which model the process context) in a source workflow model may be transformed into types in the target model. Data objects are referenced from various source model elements, including XOR splits which exclusively pass the flow to one of the outgoing branches (depending on the evaluation of a "branch condition"). Each branch condition is a Boolean predicate atop (portions of) the process context. The XOR split element may be compiled into a number of transactions (and corresponding conditions) to evaluate each branch condition in isolation. Any of these conditions (1) confirms for the existence of the referenced data objects, (2) checks that the precedent branch's condition did not hold, and (3) the flow has arrived at the XOR split. The transaction itself will evaluate the branch condition and create an instance of another type to preserve the result. A second transaction's condition may check for a positive result to pass on the flow to the respective outgoing connector. For a transformation of dedicated control flow elements (such as AND splits), compiler rules may be "blindly" applied (without further analysis of the complete flow), where there is an initial analysis stage to configure these patterns. The second stage may include linking single (sub-) networks to a whole. The model 104 for execution by a correlation engine may be considered instructions for a correlation engine or the model 104 may be further transformed in an assembly process to what may be considered instructions for a correlation engine.

The correlation engine 120 may execute the model 104 in response to an event at one of the adapters 122, 124 or in response to other events that cause state change (e.g., a transaction of another event-condition-action rule). For example, an adapter or transaction may cause the correlation engine 120 to generate an instance of a type or change state, the correlation engine 120 may determine which event-condition-action rules correspond to existing instances, and the correlation engine may flood condition networks of those rules. In addition to receiving events from adapters, adapters may be used to generate output events from the correlation engine 120. For example, execution of an action of a rule may cause an adapter to generate a web service call to another system.

The correlation engine 120 may perform a correlation between messages and parties to receive the messages, which may be referred to as message correlation, where the messages may be application-level messages of an enterprise system (e.g., application to application). For example, a correlation between subscribers of messages and published messages. In particular, multiple consumers may receive a message based on individual correlation criteria. To support correlation, workflow models that are to compiled to models for execution at the correlation engine 120 may model correlation processes and the correlation engine may be optimized for processing of condition networks such that message correlation may be performed quicker at a correlation engine than at a workflow engine. For example, each party of a messaging landscape of one or more enterprise systems may specify messages it wants to receive by using a "subscription" object having a "customer_id" attribute whose value must match a respective counterpart in the "message" objects. A correlation scenario may be implemented using a join operator to match updates from two channels. By doing so, it may combine updates referring to a "Message" and "Subscription" types to pairs. As joins are stateful operators, they may keep after images of updates from different rounds in an internal table. More complex correlation scenarios may be modeled in workflows and may be compiled to condition networks that have chained operators to express more complex correlation scenarios.

Figure 2A:
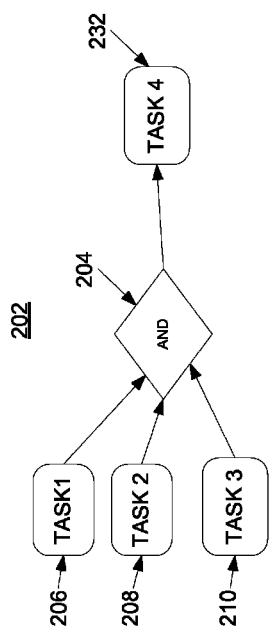
FIG. 2A is a diagram of a workflow model including a synchronization control flow pattern.

FIG. 2A is a diagram of a workflow model 202 including a synchronization control flow pattern 204. In general, a synchronization control flow pattern may be a modeling construct of a workflow modeling language where a combination of any number of threads of execution may be synchronized to a single thread of execution. For example, the workflow model 202 may represent that a thread of the first task 206, a thread of the second task 208, and a thread of the third task 210 may be synchronized to a fourth task 232.

Figure 2B:
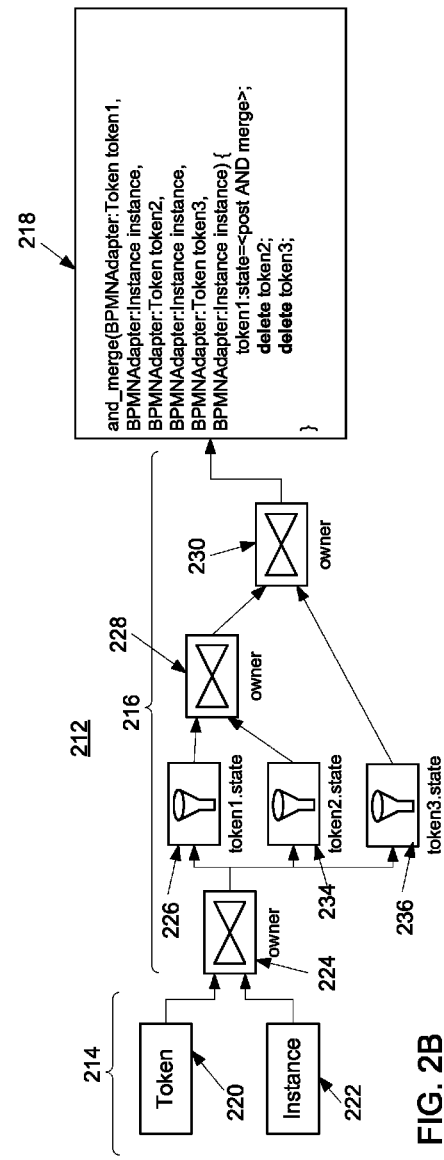
FIG. 2B is a diagram of an event-condition-action rule of an AND-merge gateway for execution by a correlation engine.

FIG. 2B is a diagram of an event-condition-action rule 212 of an AND-merge gateway for execution by a correlation engine. In general, the event-condition-action rule 212 is composed of three parts, including types 214 (which may be referred to as events or source nodes), a condition network 216 (which may be referred to as operator nodes), and transactions 218 (which may be referred to as action nodes and may include actions). The event-condition-action rule 212 may represent a synchronization control flow pattern of a control flow based model, such as the synchronization control flow pattern 204 of FIG. 2A, and may be a result of compilation of a workflow by a compiler, such as the compiler 120 of FIG. 1.

The event-condition-action-rule 212 may be based on a Rete algorithm-based model of a network of nodes, where there are three general types of nodes, including source nodes, operator nodes, and target nodes. For those types of nodes, the source nodes may represent events, operator nodes may represent conditions, and the target nodes may represent actions (which may more broadly be transactions) of an event-condition-action rule. Execution of an event-condition-action rule by a correlation engine in that paradigm may include performing a lookup of rules having source nodes that correspond to instances of objects of particular types, evaluating conditions for those instances in accordance with a network of operator nodes, and, if conditions evaluate successfully, performing one or more transactions corresponding to successful evaluation, where performing transactions may include executing a script, executing a program (e.g., a JAVA language program), updating instances to cause a further evaluation of rules (e.g., altering attributes of instances, creating instances, or deleting instances), and the like.

Evaluation of the event-condition-action rule 212 may be preceded by the following example operation of a system including a correlation engine. Predecessor transactions may be executed (e.g., transactions representing the first, second, and third tasks 206, 208, 210 of FIG. 2A) and those respective transactions may set instances token1, token2, and token3 of type Token to a state that corresponds to incoming connectors of filter operators 226, 234, 236. The correlation engine may perform a lookup of event-condition-action rules having type information of the instance of the type Token and those rules may be selected for evaluation. For each of the rules to be evaluated, a process instance token may be generated which may be passed along each of the respective networks representing the rules.

Following the example operation, evaluation of the event-condition-action rule 212 may be as follows. When one of the event-condition-action rules is evaluated such that a process token is passed to the event-condition-action rule 212, that token is received as a token 220. The process instance 222 represents that an instance of a type of object called "process instance" or "Instance" is a predicate for execution of the event-condition-action rule 212, where a type process instance is a type of object that exists throughout a lifecycle of a run-time process instance and includes information related to the run-time process instance. At a first join operator 224, pairs of all instances of token objects fitting to all instances of process instance objects are computed (e.g., they may be paired based on having a same key), as indicated by the process instance 222 being paired with the token 220 as input to the join operator 224. Then, pairs of token and process instance objects are filtered by the three filter operators 226, 234, 236 in accordance with states of corresponding ingoing connectors that may be part of a synchronization control pattern. If filter conditions are met, evaluation of the event-condition-action rule 212 may continue; otherwise, the evaluation of the event-condition-action rule 212 may end. The filter conditions of the filter operators 226, 234, 236 may be that state in which tokens must be before a merge (e.g., all tokens to be joined may be in a state ready for synchronization). The condition network 216 may be configured for a merge of three threads that may be represented by three tokens. To that end, the second and third join operators 228, 230 may provide a cascading join of the tokens to a single token. In particular, the second join operator 228 may take as input a first and second token and may join them, and the third join operator 230 may take as input the result from the second join operator 228 and a third token.

As a further description of how join operators may function, the following is a description of the combination of the token 220, process instance 22, and the join operator 224. In general, a source node may receive multiple events (at the same time or in serial order). For example, the token 220 source node may receive events corresponding to a token instance token1 being flipped to state "post task 1" (e.g., corresponding to an end of the first task 206) and a token instance token2 being flipped to a state "post task 2" (e.g., corresponding to an end of the second task 208). To perform joins, join operators may keep an internal matching table of instances received, and any matching pair of objects (according to a join predicate) from a left and right column may be the result of the join operator. For example, the join operator 224 may include a table include a left column containing identification of "Instance" objects and a right column identifying "Token" objects. A pair of the instance and token objects may be a result of the join operator 224 (i.e., any token that belongs to a process instance). Following the example of a token instance token1 and a token instance token2 being evaluated, two pairs (I, T1) and (I, T2) may be a result of the join operator 224 and those pairs may be evaluated in view of the filter operators 226, 234, 236.

The transactions 218 represent transactions to be performed at the end of the evaluation of the condition network 216. In the event-condition-action rule 212, the transactions 218 include making a state of a first token to a post merge state and deleting a second and a third token of the merged token, which may result in a single token for a thread to follow an AND-merge gateway represented by the event-condition-action rule 212.

The transactions 218 may be written in a format (e.g., a scripting language) that is platform independent such that a model for a correlation engine may be platform independent. For example, different correlation engines running on different platforms may interpret a same set of transactions in accordance with a platform independent scripting language and perform the same operations.

To generate the event-condition-action rule 212 from a workflow model, a compiler may have a library of type information, condition networks, and the like that correspond to control flow elements of a workflow language (e.g., a workflow modeling, notation language, or both) and the compiler may generate a combination of type information, condition networks, and the like to represent a workflow model based on the library of types of networks representing event-condition-action rules. For example, a compiler may map control flow elements to their representation in a paradigm including networks of nodes representing event-condition-action rules, generate copies of the networks, and link the copies of the networks to generate a set of networks representing a workflow diagram.

Figure 3:
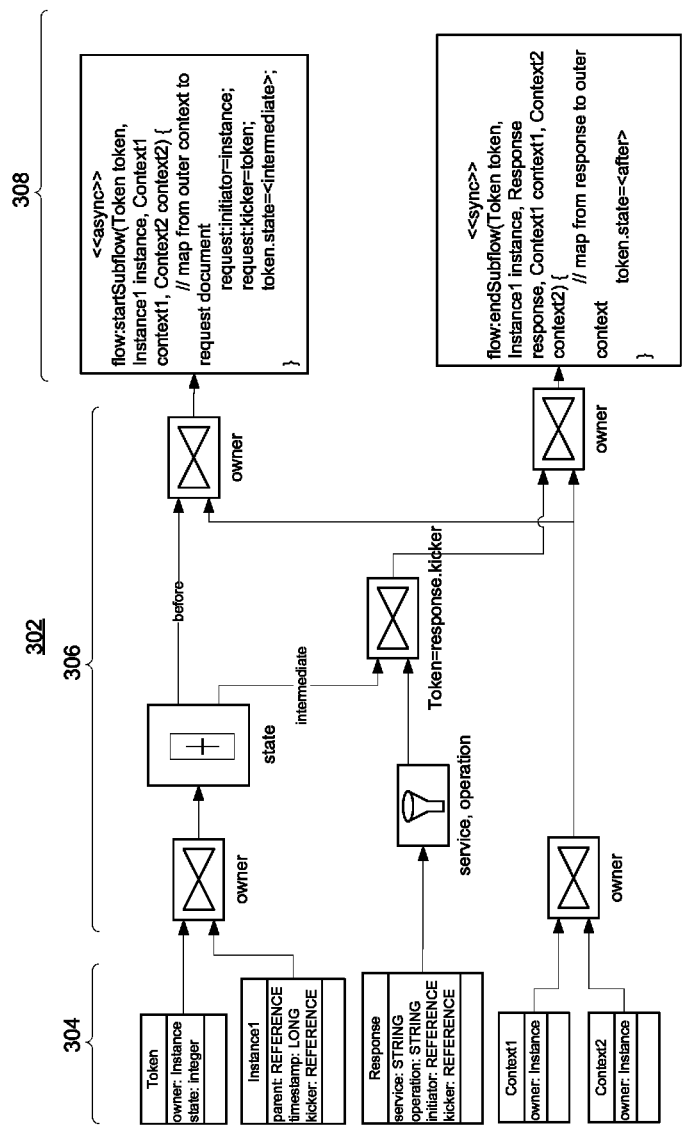
FIG. 3 is a diagram of an event-condition-action rule for independent subflows for execution by a correlation engine.

FIG. 3 is a diagram of an event-condition-action rule 302 for independent subflows for execution by a correlation engine. In general, the event-condition-action rule 302 includes types 304, a condition network 306, and transactions 308. Components of the event-condition-action rule 302 of FIG. 3 may represent similar functionality as components of the event-condition-action rule 212 of FIG. 2B. For example, the condition network 306 is an acyclic graph that may be evaluated by a correlation engine based on instances of the types 304 similar to how the condition network 216 is an acyclic graph that may be evaluated by a correlation engine based on instances of the types 214. As another example, the transactions 308 may be executed as a result of evaluation of the condition network 306 similar to how the transactions 218 may be executed as a result of evaluation of the condition network 212. In contrast to the event-condition-action rule 212 of FIG. 2B, the event-condition-action rule 302 represents a more complex control flow artifact.

In general, the event-condition-action rule 302 may be used to expose workflows in a fashion similar to synchronous web services (i.e., an incoming request may trigger a workflow which sends out a response to continue the outer flow when it ends). To perform that, invoking a subflow may construct a "request" object and trigger an outer flow after successfully correlating on a matching "response" object. The rule represented by an event-condition-action rule 302 for independent workflows may invoke a subflow via data passing, and leave a compiled subflow unchanged. Roughly, there may be two transitions generated for a "workflow reference" model element, which may be referred to as an "independent or linked-in subflow invocation". Initially (i.e., when a control flow has "arrived" at a subflow activity), an asynchronous transition may take care of generating a request document that matches the operation/service as set in a workflow reference model element. It may also switch a token state to an intermediate state signaling the execution of a subflow. Two attributes "initiator" and "kicker" may contain the instance and token objects of a calling process. The "initiator" attributes may be used by the subflow to identify the outer flow (e.g., to be able to traverse the call stack) whereas the "kicker" attribute may serve as correlation criterion for the outer flow (i.e., continue the outer flow when there is a "response" document that has a "kicker" attribute that equals the "waiting" token of the outer flow). A key extraction mechanism may be applied to a "request" document and an inner process may correlate on the service, operation, and payload to start the subflow. Vice versa, each end event within the subflow may generate a "response" document and set the subflow instance as initiator and the original (outer) token reference as "kicker". A synchronous "endSubflow" transition may check for (1) the token being in the intermediate (waiting) state and (2) the existence of a "Response" document with the right service, operation, and kicker.

Figure 4:
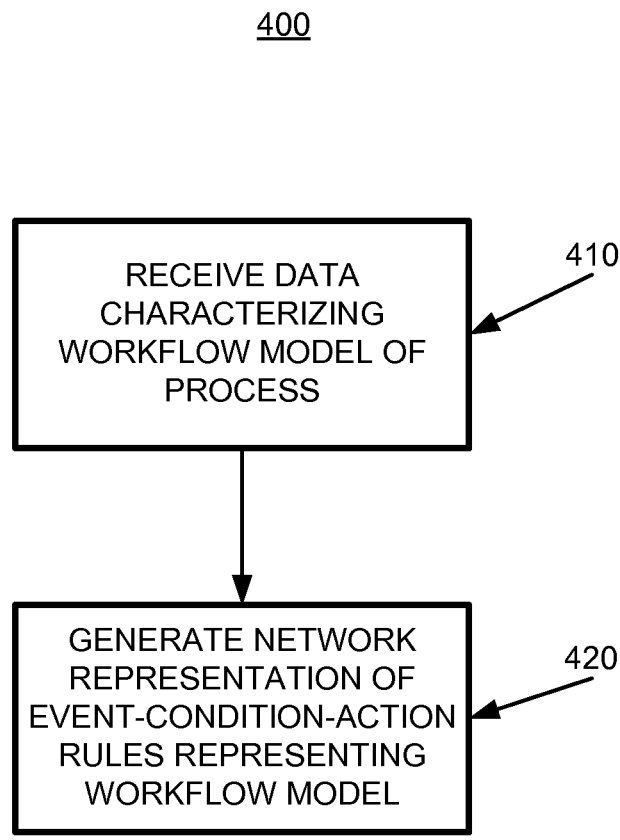
FIG. 4 is a flowchart illustrating a process to generate a model for execution by a correlation engine from a workflow model of a business process.

FIG. 4 is a flowchart illustrating a process 400 to generate a model for execution by a correlation engine from a workflow model of a business process. The process 400 may be implemented by a compiler, such as the compiler 120 of FIG. 1. In general, the process involves receiving data characterizing a workflow model of a process (410) and generating a network representation of event-condition-action rules representing the workflow model (420).

Receiving data characterizing a workflow model of a process may include receiving an identification of a workflow model or receiving the workflow model itself. The workflow model may be in accordance with BPMN and may be the result of a modeling tool.

Generating a network representation of event-condition-action rules representing the workflow model may include generating, for each element of the source model, a combination of type information, a condition network, and transactions. The type information may represent types of events (e.g., events originating from outside of a correlation engine or from a correlation engine itself when executing rules) and instances of the types may represent events that are generated. The condition network may be an acyclic graph that may be interpreted and evaluated by a correlation engine. The transactions may characterize actions to be performed as a result of evaluating conditions of a condition network. The transactions may be written in a script to be interpreted by a correlation engine. To generate the network representation of event-condition-action rules, a three stage process, such as the three stage process described with reference to FIG. 1 may be implemented.

Although the process 400 of FIG. 4 includes a certain number and type of sub-processes, implementations may vary. For example, the process may include further sub-processes to reflect a modeling/execution lifecycle (e.g., model, compile, deploy, activate, run, patch, re-compile, re-deploy, activate). As another example, the sub-process 420 may further include several compilation phases. For example, the phases may include analysis, artifact-by-artifact compilation (e.g., compilation from a source artifact in a workflow paradigm to a target artifact in a paradigm for a network-based representation of event-condition-action rules), optimization, versioning, and assembly (e.g., transformation from a network-based representation of event-condition-action rules to a format understood for execution by a correlation engine).

Similarly, although FIG. 1 includes a certain type and number of components, implementations may vary. For example, the system 100 need not include adapters and configurations for adapters. As another example, an engine other than a correlation engine may execute networks representing event-condition-action rules that are compiled from workflow models.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in an information carrier, e.g., in a machine-readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or nonvolatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

The subject matter described herein has been described in terms of particular embodiments, but other embodiments can be implemented and are within the scope of the following claims. For example, operations can differ and still achieve desirable results. In certain implementations, multitasking and parallel processing may be preferable. Other embodiments are within the scope of the following claims

What is claimed is:

1. A computer-implemented method for implementation by one or more data processors comprising:
    receiving, by at least one of the data processors, data characterizing a workflow of a process; and
    generating, by at least one of the data processors, a network representation of event-condition-action rules representing the workflow;
    wherein the network representation of event-condition-action rules comprises a combination of source nodes representing events, operator nodes representing conditions, and action nodes representing transactions, and
    wherein the events of the source nodes are represented as types of objects of a type language.

2. The method of claim 1, wherein the workflow of the process is modeled in accordance with a modeling language.

3. The method of claim 2, wherein the modeling language uses Business Process Modeling Notation comprising flow objects, connecting objects, swimlanes, and artifacts.

4. The method of claim 1, wherein the generating comprises generating, by at least one of the data processors, a network of event-condition-action rules for each component of the workflow to generate a set of networks and linking the networks to reflect a linking of components of the workflow.

5. The method of claim 1, wherein the generating further comprises generating, by at least one of the data processors, type information according to a type language for adapters and generating custom adapter configuration to influence runtime behavior of adapters.

6. The method of claim 1 further comprising using a correlation engine to execute an event-condition-action rule based on a combination of types of a rule being instantiated.

7. The method of claim 1, wherein the operator nodes are selected from types of operator nodes comprising a filter operator node type and a join operator node type.

8. The method of claim 1, wherein the action nodes comprise a script in accordance with a scripting language to describe transactions to be performed upon evaluation of operator nodes connected to corresponding action nodes.

9. A computer program product, embodied on a non-transitory computer-readable medium, the product comprising instructions to cause a data processing apparatus to perform operations comprising:
    receiving a workflow model comprising a plurality of notation elements that include data characterizing a workflow of a business process, the notation elements comprising a subset of notation elements that affect execution of a workflow relating to the business process;

compiling a target model of the business process, the target model being executable by a correlation engine, the compiling comprising generating a network representation of event-condition-action rules representing the workflow, the network representation of event-condition-action rules comprising, for each notation element in the subset, a combination of source nodes representing events, operator nodes representing conditions, and action nodes representing transactions; and mapping each notation element in the subset of notation elements of the workflow model to a corresponding combination of source node, operator nodes, and action nodes in the target model, wherein the events of the source nodes are represented as types of objects of a type language.

10. The product of claim 9, wherein the workflow of the process is modeled in accordance with a modeling language.

11. The product of claim 9, wherein the generating further comprises generating type information according to a type language for adapters and generating custom adapter configuration to influence run-time behavior of adapters.

12. The product of claim 9, wherein a correlation engine is configured to execute an event-condition-action rule based on a combination of types of a rule being instantiated.

13. The product of claim 9, wherein the operator nodes are selected from types of operator nodes comprising a filter operator node type and a join operator node type.

14. The product of claim 9, wherein the action nodes comprise a script in accordance with a scripting language to describe transactions to be performed upon evaluation of operator nodes connected to corresponding action nodes.

15. The product of claim 9, wherein the compiling further comprises:

tagging an edge of a control flow in the workflow model with a unique identifier, the tagging comprising identifying a state of the control flow edge for the correlation engine to correlate on during execution of the target model; and applying a compiler ruler to each of the notation elements independently, the compiler rule for each notation element being applied based a corresponding element type of that notation element.

16. A computer system comprising:
memory storing instructions and data;
at least one processor for executing the instructions to implement operations comprising:
receiving data characterizing a workflow of a process; and
generating a network representation of event-condition-action rules representing the workflow;
wherein the network representation of event-condition-action rules comprises a combination of source nodes representing events, operator nodes representing conditions, and action nodes representing transactions, and
wherein the events of the source nodes are represented as types of objects of a type language.

17. The system of claim 16, wherein the workflow of the process is modeled in accordance with a modeling language.

18. The system of claim 16, wherein the generating comprises generating a network of event-condition-action rules for each component of the workflow to generate a set of networks and linking the networks to reflect a linking of components of the workflow.

19. The system of claim 16, wherein the generating further comprises generating type information according to a type language for adapters and generating custom adapter configuration to influence run-time behavior of adapters.

20. The system of claim 16 further comprising a correlation engine configured to execute an event-condition-action rule based on a combination of types of a rule being instantiated.

21. The system of claim 16, wherein the operator nodes are selected from types of operator nodes comprising a filter operator node type and a join operator node type; and wherein the action nodes comprise a script in accordance with a scripting language to describe transactions to be performed upon evaluation of operator nodes connected to corresponding action nodes.

* * * * *